Figures 1, 2:
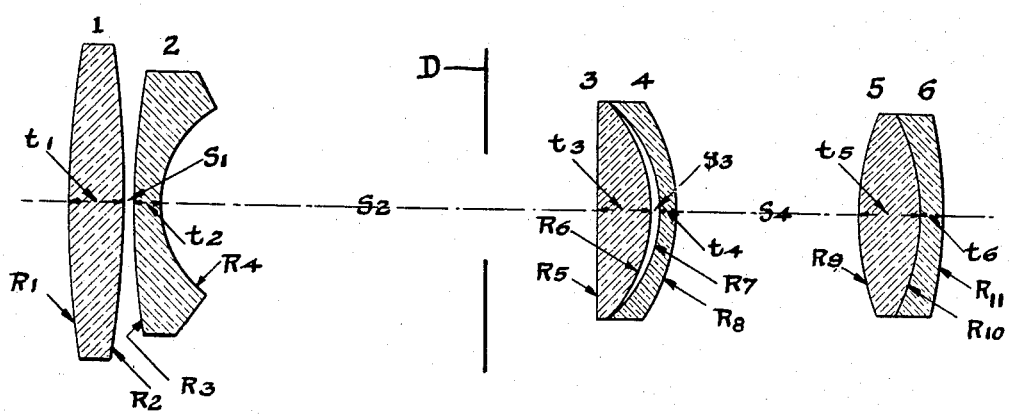

| F = 10 mm | | | | f/1.9 |
|---|---|---|---|---|
| LENS | $N_D$ | V | RADII mm. | THICKNESSES mm. |
| 1 | 1.750 | 27.2 | $R_1$ = +71.40<br>$R_2$ = −80.22 | $t_1$ = 4.05<br>$S_1$ = .55 |
| 2 | 1.610 | 58.3 | $R_3$ = +55.62<br>$R_4$ = +8.09 | $t_2$ = 1.80<br>$S_2$ = 30.82 |
| 3 | 1.610 | 58.2 | $R_5$ = PLANO<br>$R_6$ = −10.35 | $t_3$ = 4.08<br>$S_3$ = .23 |
| 4 | 1.750 | 27.3 | $R_7$ = −9.85<br>$R_8$ = −16.21 | $t_4$ = 1.35<br>$S_4$ = 13.42 |
| 5 | 1.610 | 58.1 | $R_9$ = +20.01<br>$R_{10}$ = −14.22 | $t_5$ = 4.15<br>$t_6$ = 1.385 |
| 6 | 1.750 | 37.3 | $R_{11}$ = −42.80 | BF = 16.20 |

INVENTORS
Robert E. Hopkins
By David Goldstein their Attorney

Patented Apr. 22, 1952

2,594,020

UNITED STATES PATENT OFFICE 2,594,020

WIDE-ANGLE PHOTOGRAPHIC OBJECTIVE

Robert E. Hopkins and David Goldstein, Rochester, N. Y., assignors to Elgeet Optical Company, Inc., Rochester, N. Y., a corporation of New York Application June 25, 1949, Serial No. 101,282

4 Claims. (Cl. 88—57)

Our present invention relates to optics and more particularly to lens systems for photographic purposes and it has for its general object to provide an improved objective for motion picture cameras in which will be combined the desirable features of a long back focus permitting locating the focal plane of the field of exposure a greater distance from the back surface of the back lens, a wide field of view, and a large relative aperture.

A further object of the invention is to produce a lens of this character which will, further, be well corrected for spherical aberration, chromatic aberrations, distortion, coma, astigmatism and curvature of field.

To these and other ends the invention resides in certain improvements and combinations of parts, all as will hereafter be more fully described, the novel features being pointed out in the claims at the end of this specification.

In the drawing:

Fig. 1 is an axial section of a wide-angle objective made according to one embodiment of this invention; and Fig. 2 is a chart giving constructional details for one embodiment of the invention.

Referring thereto, a lens of the type illustrated with a focal length of 10 has a back focus of 16.2, covers a full field of 46° and works up to aperture ratios of f/1.9. The specific tabulated data produces a lens of this type which works at f1.9 at a focal length of 10 mm. It is made of three widely separated components comprising two elements each, 1—2, 3—4 and 5—6, respectively. Each component is separately made achromatic. The front component 1—2 has negative power and the two rear components have positive power. The air space between components 1—2 and 3—4 should be as large as the desired size of lens will permit. In the design shown in the drawing this spacing $S_2$ is made three times the focal length. If less, in proportion, it is difficult to correct the spherical aberration for a large aperture. The rear component 5—6 is spaced from the center component 3—4 to introduce positive astigmatism but should still be placed as close thereto as possible. The spacing in the accompanying showing is 1.3 times the focal length. If it is made less, the spherical aberration is improved, the field curvature is also improved but the astigmatism is made more negative. The opposite is true if the space is increased. The power of the negative component 1—2 relative to components 3—4 and 5—6 is adjusted to provide for the desired field curvature when combined therewith.

The combination of individual lens elements in component 1—2 is made achromatic by using two glasses of widely different dispersive power and of high index. Extra dense flint glasses are most suitable for the positive element 1 while dense barium crowns are most suitable for the negative element 2, the positive element being located on the outside and separated from the other by space $S_1$. The shape of these elements is determined primarily by the large amount of distortion they must introduce. The power of this combination of elements is as just mentioned.

The combination of individual lens elements in component 3—4 can be made achromatic by using glasses of the same type as in component 1—2 except that the positive element 3 is dense barium crown and the negative 4 is extra dense flint. They are air spaced at $S_3$ to correct the zonal spherical aberration and the extent of their separation depends upon the amount to be eliminated. It is preferable to place the positive element facing the component 1—2. This component 3—4 is made as powerful as possible while still maintaining the required spherical correction but its main function is to provide the power of the system and to correct the coma and spherical aberration left over from the other two components.

The rear component 5—6 can be made achromatic by using glasses of the same type as those used in the center component and the doublet can be used either as a cemented or an air spaced lens, the former being shown in the present embodiment of the invention. This air space can be used effectively to correct some of the oblique rays in the upper part of the beam assuming, for instance, an object to be below the axis in the object space. It is preferable to place the positive element 5 facing the middle component as shown.

Of course the distortion and the astigmatism in component 1—2 cannot be simultaneously corrected. In our present lens, the function of this component 5—6 is to provide the necessary positive astigmatism for this correction which, with the form shown and in its spaced relation to the middle component it most effectively does.

The aperture diaphragm in the system is located in front of the middle component 3—4 as indicated at D at a distance sufficient to allow the use of an iris diaphragm. In the showing of the figure the distance is 4.12 mm.

In the following table the radii (R) of curvature of the lenses, their thicknesses ($t$), the air spaces (S) between them, and the back focal length (BF), the refractive indices ($N_D$) for the D line of the spectrum, the dispersive indices (V), and the focal length (F) for an objective constructed according to one embodiment of the invention are given:

F = 10 mm.   f/1.9

| Lens | $N_D$ | V | Radii mm. | Thicknesses mm. |
|---|---|---|---|---|
| 1 | 1.750 | 27.2 | $R_1 = +71.40$ | $t_1 = 4.05$ |
|   |       |      | $R_2 = -80.22$ | $S_1 = .55$ |
| 2 | 1.610 | 58.3 | $R_3 = +55.62$ | $t_2 = 1.80$ |
|   |       |      | $R_4 = + 8.09$ | $S_2 = 30.82$ |
| 3 | 1.610 | 58.2 | $R_5 = $ Plano | $t_3 = 4.08$ |
|   |       |      | $R_6 = -10.35$ | $S_3 = .23$ |
| 4 | 1.750 | 27.3 | $R_7 = -9.85$  | $t_4 = 1.35$ |
|   |       |      | $R_8 = -16.21$ | $S_4 = 13.42$ |
| 5 | 1.610 | 58.1 | $R_9 = +20.01$ | $t_5 = 4.15$ |
|   |       |      | $R_{10} = -14.22$ | $t_6 = 1.38$ |
| 6 | 1.750 | 37.3 | $R_{11} = -42.80$ | BF = 16.205 |

We claim as our invention:

1. A wide-angle photographic objective of long back focus and large relative aperture for use in a photographic camera, consisting of three coaxial components, air-spaced one from another, each of said components comprising a plurality of lenses, the front component being negative in power and the others both positive, the front component comprising a double convex lens and a convex-concave lens and introducing negative astigmatism, and the rear component introducing positive astigmatism, the concave face of said convex-concave lens facing the middle component, the distortion of the middle and rear components being balanced out by opposite distortion of the front component, said middle component comprising a plano-convex lens and a concavo-convex lens with an air gap between them, the plane face of said plano-convex lens and both faces of said concavo-convex lens facing toward the front component and the air space between the middle component and the rear component being greater than the focal length of the objective, and the air space between the front component and the middle component being a multiple of the focal length of the objective and being at least twice as great as the air space between the middle component and the rear component.

2. A wide angle photographic objective of long back focus and large relative aperture for use in a photographic camera consisting of three coaxial components, air-spaced one from another, each of said components comprising a plurality of lenses, the front component being adapted to be positioned in front of the aperture diaphragm of the camera and being negative in power, and comprising a double convex and a convex-concave lens with an air-gap between them, the middle and rear components being adapted to be positioned behind said aperture diaphragm and both being positive in power, said middle component comprising a plano-convex and a concavo-convex lens with an air gap between them, the plane face of said plano-convex lens and both faces of said concavo-convex lens facing toward said aperture diaphragm, said rear component comprising a double convex and a concavo-convex lens, the front component of the objective introducing negative astigmatism and the rear component producing positive astigmatism, the middle component taking out coma and spherical aberration and the distortion of the middle and rear components offsetting the distortion of the front component, the air space between the front component and the middle component being three times the focal length and the air space between the middle component and the rear component being 1.3 times the focal length.

3. A wide angle photographic objective of long back focus and large relative aperture for use in a photographic camera and comprising a front, a middle, and a rear component which are coaxial and which are air-spaced from one another, each of said components comprising a plurality of lenses, the front component being negative in power and comprising a double convex and a convex-concave lens with an air gap between them, the concave face of said convex-concave lens facing rearwardly, the middle and rear components being both positive in power, said middle component comprising a plano-convex and a concave-convex lens with an air gap between them, the plane face of said plano-convex lens and both faces of said concave convex lens facing forward, said rear component comprising a double convex and a concave-convex lens, the concave face of said last-named concave-convex lens facing forward, the air space between the middle and rear components being at least as great as the focal length of the objective and the air space between the front and middle components being a multiple of said focal length, the front component introducing negative astigmatism and the rear component producing positive astigmatism, the middle component taking out coma and spherical aberration, and the distortion of the middle and rear components offsetting the distortion of the front component.

4. A wide angle photographic objective of long back focus and large relative aperture for use in a photographic camera, consisting of three coaxial components, air-spaced from one another, the front component comprising a double convex and a convex-concave lens with an air gap between them, the middle component comprising a plano-convex and a concavo-convex lens with an air gap between them, and the rear component comprising a double convex and a concavo-convex lens, and conforming substantially to the specifications in the following table:

F = 10 mm.   f/1.9

| Lens | $N_D$ | V | Radii mm. | Thicknesses mm. |
|---|---|---|---|---|
| 1 | 1.750 | 27.2 | $R_1 = +71.40$ | $t_1 = 4.05$ |
|   |       |      | $R_2 = -80.22$ | $S_1 = .55$ |
| 2 | 1.610 | 55.3 | $R_3 = +55.62$ | $t_2 = 1.80$ |
|   |       |      | $R_4 = + 8.09$ | $S_2 = 30.82$ |
| 3 | 1.610 | 58.2 | $R_5 = $ Plano | $t_3 = 4.08$ |
|   |       |      | $R_6 = -10.35$ | $S_3 = .23$ |
| 4 | 1.750 | 27.3 | $R_7 = -9.85$  | $t_4 = 1.35$ |
|   |       |      | $R_8 = -16.21$ | $S_4 = 13.42$ |
| 5 | 1.610 | 58.1 | $R_9 = +20.01$ | $t_5 = 4.15$ |
|   |       |      | $R_{10} = -14.22$ | $t_6 = 1.385$ |
| 6 | 1.750 | 37.3 | $R_{11} = -42.80$ | BF = 16.20 |

Where the lens elements are numbered in order from front to rear, the corresponding refractive indices for the D line of the spectrum are specified in the second column under $N_D$, the corresponding dispersive indices are specified in the third column under V, the radii of curvature R are specified in the fourth column and the thicknesses $t$ and air-spacing $S$ are specified in the fifth column, $F$ being the focal length of the objective, $f$ denoting the aperture ratio, and $BF$ the back focus.

ROBERT E. HOPKINS.
DAVID GOLDSTEIN.

REFERENCES CITED

The following references are of record in the file of this patent:

UNITED STATES PATENTS

| Number | Name | Date |
|---|---|---|
| 65,729 | Dallmeyer | June 11, 1867 |
| 1,415,002 | Repp | May 2, 1922 |
| 1,584,272 | Bertele | May 11, 1926 |
| 1,863,099 | Bowen | June 14, 1932 |
| 1,955,590 | Lee | Apr. 17, 1934 |
| 2,341,385 | Kingslake et al. | Feb. 8, 1944 |
| 2,428,122 | Montani | Sept. 30, 1947 |